United States Patent [19]

Olins

[11] Patent Number: 4,702,511
[45] Date of Patent: Oct. 27, 1987

[54] TAILGATE CLOSURE MECHANISM

[75] Inventor: Richard C. Olins, Toronto, Canada

[73] Assignee: Diesel Equipment Limited, Toronto, Canada

[21] Appl. No.: 2,384

[22] Filed: Jan. 12, 1987

Related U.S. Application Data

[63] Continuation-in-part of Ser. No. 820,118, Jan. 21, 1986, abandoned.

[51] Int. Cl.⁴ ............................................... B60P 1/26
[52] U.S. Cl. ................................. 296/57 R; 414/545; 74/103
[58] Field of Search .............. 296/57 R, 50, 56, 17 A, 296/61; 298/23; 49/358; 16/188; 414/545

[56] References Cited

U.S. PATENT DOCUMENTS

| 3,834,565 | 9/1974 | Goodman, Jr. et al. | 296/61 |
| 3,889,827 | 6/1975 | Fene | 296/61 |
| 4,052,106 | 10/1977 | Louderback, Sr. | 298/23 MD |
| 4,076,310 | 2/1978 | Schwalm | 296/57 R |

Primary Examiner—Robert R. Song
Attorney, Agent, or Firm—Fetherstonhaugh & Co.

[57] ABSTRACT

A powered closure mechanism for moving a tailgate from an open position to a closed position comprises a reciprocating drive mechanism mounted on the tailgate and a power transmission which connects the reciprocating drive to the tailgate so that it will rotate the tailgate between an open and closed position in response to operation of the reciprocating drive mechanism.

7 Claims, 6 Drawing Figures

TAILGATE CLOSURE MECHANISM

RELATED APPLICATIONS

This application is a continuation-in-part of Application Ser. No. 820,118 filed Jan. 21, 1986, now abandoned.

This invention relates to tailgate assemblied for trucks and the like. In particular, this invention relates to tailgate assemblies which has a powered mechanism for opening and closing the tailgate.

BACKGROUND OF INVENTION

Tailgates and particularly tailgates which are used as lifting platforms for lifting a load to the level of the floor of a truck are of a heavy construction and require the exercise of considerable force in order to pivot the tailgate from its horizontal opened position to its upright closed position.

Torsion bars are commonly provided for the purposes of assisting the manual opening and closing of the tailgate. In order to ensure that the tailgate will remain in an opened position in use the torsion bars do not have sufficient power to automatically pivot the tailgate from the horizontal positon to the upright position.

Other power operated mechanisms have been proposed for use in providing a positive drive for driving the tailgate between its horizontal position and its vertical position for opening and closing the tailgate. These mechanisms have, however, been complex mechanisms which include a power transmission mechanism which extends from the frame to the platform and which are easily damaged in use because of the fact that they are exposed to the harsh environment in which these vehicles are required to operate.

SUMMARY OF INVENTION

It is an object of the present invention to provide an improved power closure mechanism for moving a tailgate from an opened position to a closed position.

It is a further object of the present invention to provide an improved power closure mechanism for a tailgate in which the moving components are mounted on the tailgate.

It is a further object of the present invention to provide an improved powered closure mechanism for moving a tailgate between an opened position and a closed position in which the primary power source is a reciprocating ram and the power transmission means serves to translate the reciprocating movement of the ram into rotational movement of the platform.

According to one aspect of the present invention, there is provided in a tailgate assembly of a truck or the like in which the tailgate is mounted for pivotal movement with respect to a support frame between an open position in which the tailgate is horizontally disposed and a closed position in which the tailgate in an upright position, the improvement of a powered closure mechanism for moving the tailgate from the opened position to the closed position comprising reciprocating drive means mounted on said tailgate and having a reciprocating member which is movable with respect to said tailgate, power transmission means connecting said reciprocating member to said tailgate for rotation of said tailgate about said first axis in response to movement of said reciprocating member with respect to said tailgate thereby to raise said tailgate from said horizontal position to said vertical position.

According to a further aspect of the present invention, there is provided in a tailgate assembly of a truck or the like in which the tailgate is mounted for pivotal movement with respect to a support frame between an open position in which the tailgate is horizontally disposed and a closed position in which the tailgate is an upright position, the improvement of a powered closure mechanism for moving the tailgate from the opened position to the closed position which comprises, a shaft mounted on and fast with respect to said frame, said shaft having its axis aligned with said first axis, said tailgate being mounted for rotation on said shaft, a stationary pinion mounted on and fast with respect to said shaft, a reversible motor mounted on said tailgate for movement therewith, said motor having a power output shaft, a power output pinion mounted on said power output shaft for rotation therewith, reduction gear means drivingly connecting said power output pinion and said stationary pinion such that operation of said motor to cause rotation of said power output shaft in one direction will cause rotation of said tailgate in a first direction about said first axis and operation of said motor to cause rotation of said tailgate in a second direction opposite to said first direction to open or close said tailgate as required in use.

BRIEF DESCRIPTION OF THE DRAWINGS

The invention will be more clearly understood after reference to the following detailed specification read in conjunction with the drawings wherein;

With reference to FIG. 1 of the drawings, the reference numeral 10 refers generally to a tailgate assembly constructed in accordance with an embodiment of the present invention which is mounted at the rear end of a truck 12. The tailgate assembly includes a stationary frame 14 which consists of a pair of upright guide rails 16. A pair of slide members 18 (FIG. 2) are slidably mounted in the upright guide rails 16. A flange 20 projects outwardly from each slide member 18 through the slot 22 which is formed in the guide rail 16. Stub shafts 24a and 24b are mounted on opposite flanges 20 and are secured against rotation with respect to the flanges 20 by means of arms 26a and 26b respectively to which the shafts are welded. The arms 26a and 26b are secured to the flanges 20 by means of bolts 28.

Figures 1, 2:
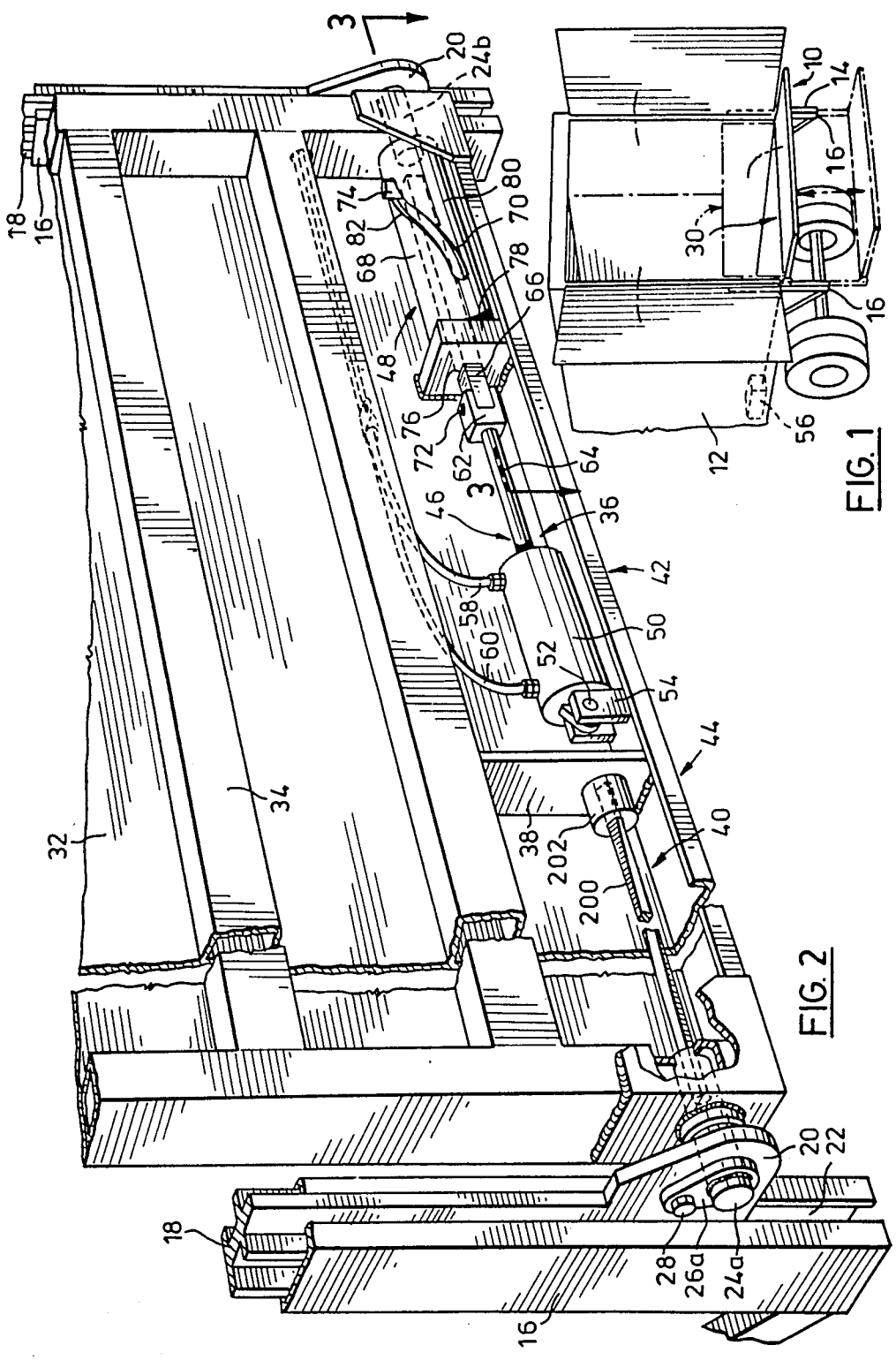
FIG. 1 is a pictorial view of an end of a truck showing the manner in which a tailgate is mounted thereon for movement between an opened position and a closed position and a raised position and a lowered position.
FIG. 2 is a partially sectioned pictorial view of a portion of the tailgate of FIG. 1 shown in the upright position.

The tailgate is generally identified by the reference numeral 30. The tailgate 30 comprises a platform 32 which is mounted on a support frame 34. A recess 36 is formed in the underside of the tailgate 30 to one side of a divider plate 38 and a recess 40 is formed on the other side of the divider plate 38. A powered closure mechanism generally identified by the reference numeral 42 is located in the recess 36 and a torsion bar closure assist device generally identified by the reference numeral 44 is located in the recess 40.

The torsion bar assembly 44 is of a conventional construction similar to that previously used in these installations. One end of the torsion bar 200 is mounted in a boss 202 which is mounted on the divider plate 38 and the other end is mounted in the inner end of the stub shaft 24a. The torsion bar 200 is twisted before mounting in the boss 202 and shaft 24a so as to normally urge the tailgate toward the upright position.

The powered closure mechanism 42 will not be described with reference to FIGS. 2, 3 and 4 of the drawings.

The powered closure mechanism consists of a reciprocating drive mechanism generally identified by the reference numeral 46 and a power transmission mechanism generally identified by the reference numeral 48. The reciprocating drive mechanism consists of a double acting hydraulic cylinder 50 which has one end secured with respect to the tailgate by means of a pivot pin 52 which is mounted in brackets 54. A fixed displacement pump 56 (FIG. 1) is connected to an on/off two-way control valve 57 which is in turn connected to the cylinder 50. A ram 64 projects from the cylinder 50 and can be driven axially to and fro by supplying hydraulic fluid through one or other of the conduits 58 and 60. The ram 64 has a U-shaped coupling 62 at its outer end.

The power source for the cylinder 50 is the fixed displacement pump 56 which is also used for raising and lowering the tailgate. As shown diagrammatically in FIG. 7, the pump 56 is connected to a sump 55 by means of a conduit 53. A conduit 51 connects the pump to a four-way valve 57 and conduits 58 and 60 connect the valve to the cylinder 50. A return conduit 49 connects the valve 57 to the sump 55.

The solenoid valve 57 is operated by a toggle switch 61 which has a toggle 63 which may be located in the neutral position shown in solid lines in FIG. 7 or either of the two operating positions shown in broken lines. When the toggle 63 is in the position shown in solid lines in FIG. 7, the hydraulic fluid delivered by the pump 56 is merely returned to the sump through the conduit 49. When the toggle 63 is displaced to one or other of the positions shown in broken lines, the hydraulic fluid is supplied to one or other of the conduits 58 or 60 so as to drive the ram 64 in one direction or the other.

The power tranmission mechanism 48 consists of a first cam member 66 and a second cam member 68. The first cam member 66 is in the form of a square-shaped rod 70, the proximal end of which is connected to the U-shaped end piece 62 by means of a pin 72. A cam follower 74 projects outwardly from the rod 70. The square-shaped rod 70 is slidably mounted in a square-shaped passage 76 which is formed in a bracket 78 which is welded to the frame 34 and platform 32. This plate 78 acts as a retainer plate which prevents rotation of the square-shaped rod 66 relative to the tailgate.

The second cam member 68 comprises a tubular member 80 which has a helical shaped cam track 82 opening through its wall. The cam follower 74 projects through the cam track 82.

Figure 3:
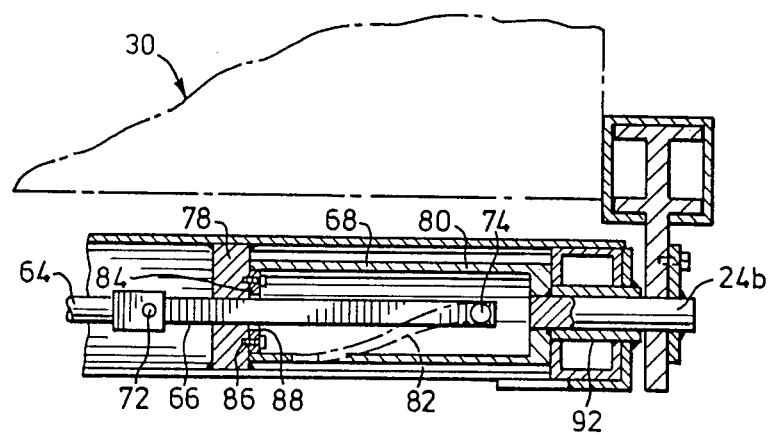
FIG. 3 is a sectional view taken along the line 3–3 of FIG. 2.
Figure 4:
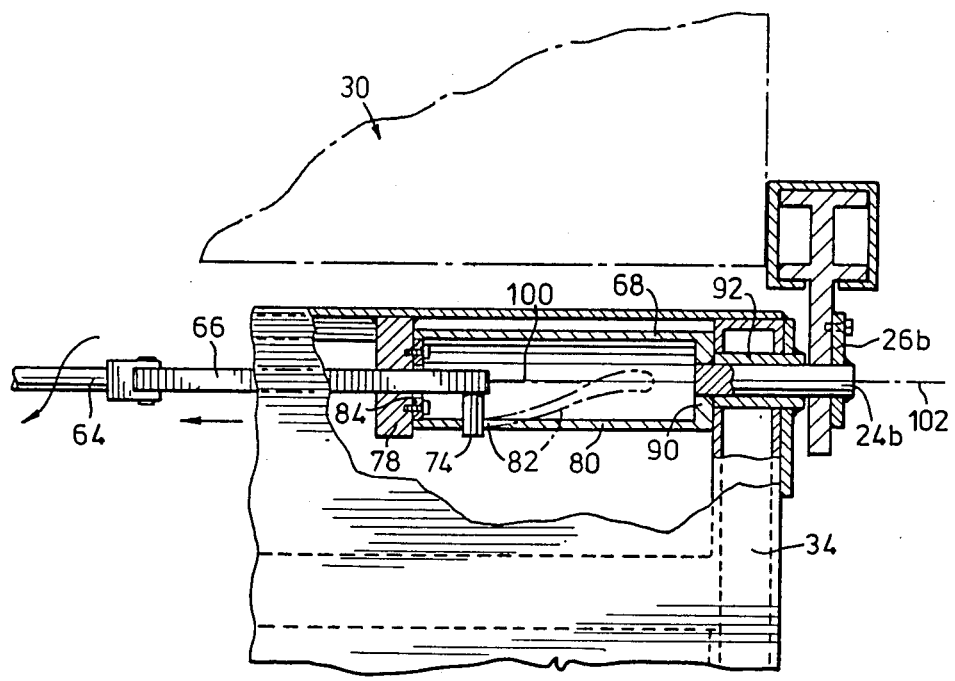
FIG. 4 is a view similar to FIG. 3 showing the tailgate in the opened horizontal position.

As shown in FIGS. 3 and 4 of the drawings, a bearing member in the form of an annular disk 84 is mounted on the brackets 78 by means of mounting screws 86. The opened end 88 of the tubular member 80 is mounted on the bearing disk 84 such that the bearing 84 and the bracket 78 on which it is mounted are rotatable with respect to the tubular member 80. The stub shaft 24b has its inner end mounted and held fast with respect to the end wall 90 of the second cam member 68. A sleeve bearing 92 supports the frame 34 for rotation about the stub shaft 24b.

In use when the tailgate is in the upright position illustrated in FIG. 2 of the drawings and it is desired to lower the tailgate, hydraulic fluid is supplied to the double acting hydraulic cylinder 50 from the pump 56 through the conduit 58 thereby to cause the ram 64 to be retracted. This action of the ram causes the first cam member 66 to move to the left from the position shown in FIG. 2 and this causes the cam follower 74 to move with respect to the cam track 82. Because the tubular member 80 is held fast with respect to the frame 14, the first cam member 66 is caused to rotate about the axis 100 of the tubular member 80. The axis 100 is axially aligned with the axis 102 of the stub shaft 24b. Rotation of the first cam member 66 causes rotation of the bracket 78 which as previously indicated is secured to the tailgate 30 with the result that the tailgate 30 is caused to rotate from its upright position to its horizontal position.

In order to move the tailgate from the horizontal position to the upright position, it is merely necessary to supply the hydraulic fluid to the cylinder 50 through the conduit 60. This causes the first cam member 66 to reciprocate in the opposite direction to drive the cam follower 74 along the cam track 82 which in turn causes rotation of the first cam member 66 and thereby rotation of the tailgate to the upright position.

An important feature of this embodiment of the present invention is the fact that the rate of angular displacement of the tailgate when moving to and fro between the horizontal position and the upright position is controlled so that the tailgate will not snap shut when it approaches the upright position nor will it fall open when it approaches the horizontal position. This is achieved by ensuring that the movement of the ram 64 is positively controlled so that it can only move in response to the supply of hydraulic fluid to the hydraulic cylinder.

In a typical tailgate construction, the tubular member 80 may have a diameter of 3" and the stroke of the ram 64 may be 6" with the result that the angle of inclination of the cam track with respect to the direction of movement of the cam follower is of the order of about 23°. Because of this shallow incline, the closing torque which is applied to the tailgate through the torsion bar assembly while assisting in the closing, is not sufficient to drive the cam follower along the cam track to cause the movement of the tailgate to accelerate to slam closed.

Various modifications of the present invention will be apparent to those skilled in the art.

Figure 5:
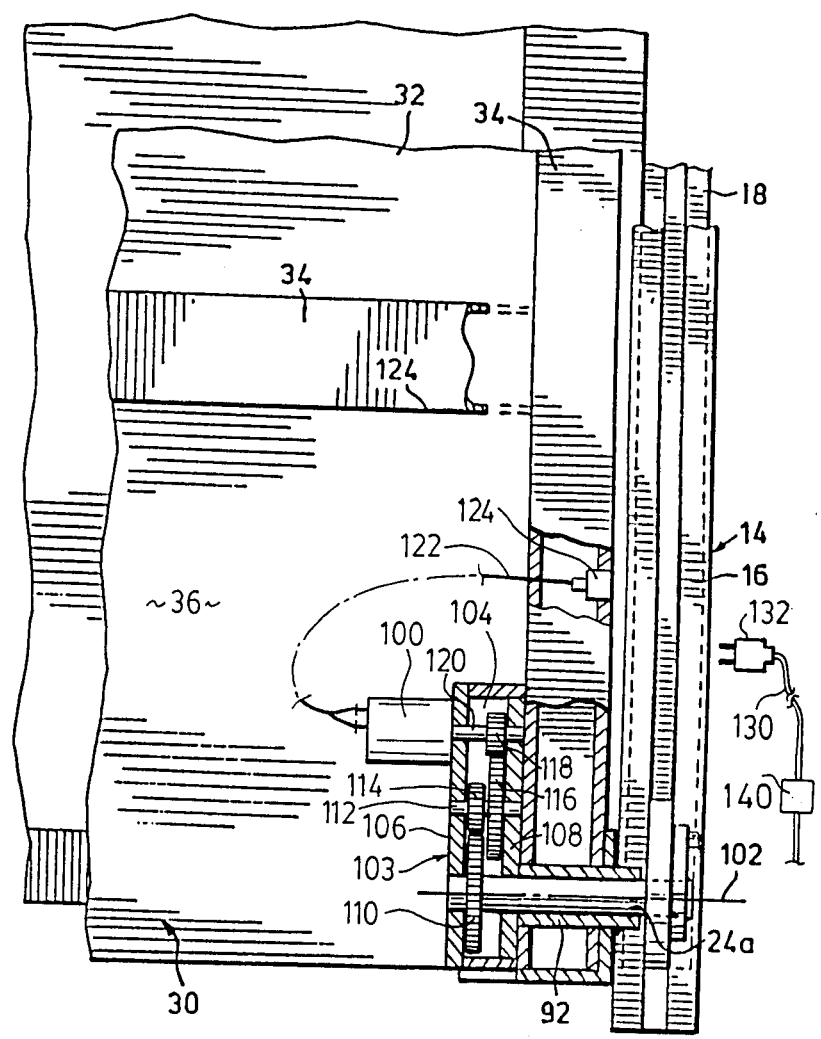
FIG. 5 is a partially sectioned view of a tailgate in the upright position showing a power closure mechanism according to a further embodiment.
Figure 6:
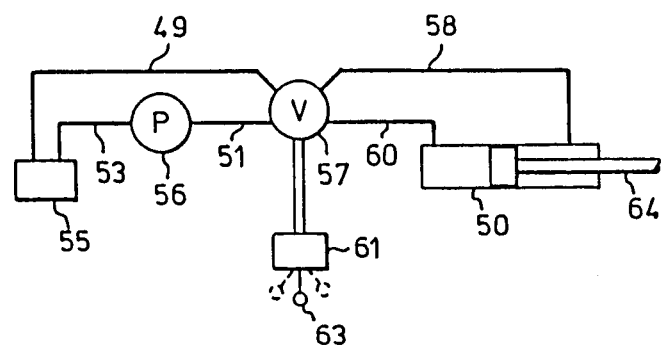
FIG. 6 is a diagram illustrating the power source and control for operating the powered mechanism of FIGS. 2 to 4.

One modificiation is illustrated in FIG. 5 of the drawings wherein like numerals are applied to like parts to those appearing in FIGS. 1 to 4 of the drawings. In this embodiment, the power source is a reversible electricl motor 100 which is located in recess 36 which forms a storage compartment on the underside of the tailgate 30. The motor 100 is a reversible electric motor. A reduction gearbox 103 is also mounted in the recess 36. The reduction gearbox 103 has an enclosed chamber 104 formed therein. The gearbox 103 has oppositely disposed face plates 106 and 108. The inner end of the stub shaft 24A extends through the face plates 108 and 106 and has a stationary pinion 110 mounted thereon. The stationary pinion 110 is keyed to the stub shaft 24A. An idler shaft 112 is also mounted in the face plates 106 and 108. A pinion 114 mounted on the shaft 112 is meshed with the stationary pinion 110. A pinion 116 which is fast with respect to the pinion 114 is also mounted on the shaft 112. The pinion 116 is meshed with the power output pinion 118 which is mounted on the power output shaft 120 of the motor 100. The power output shaft 120 is mounted for rotation in the face plates 106 and 108 and supported by suitable bearings. The power output pinion 118 is keyed to the power output shaft 120.

The electrical power is supplied to the motor 110 through a cable 122 which is connected to a socket 124 mounted in the support frame 34.

The power supply to the socket 114 may be from any DC source such as the battery of the vehicle in which the tailgate is installed. The power source may be supplied through a cable 130 and a plug 132. Reversal of the direction of operation of the motor may be achieved by reversing the manner in which the plug 132 is inserted into the socket 124. Suitable markings may be provided on the plug 132 and socket 124 to indicate the manner in which the plug should be inserted to effect raising or lowering of the tailgate. The socket 124 and plug 132 may be conventional two-pin electrical plugs and sockets. A current sensing device 140 is provided in the line 142 which leads to the plug 132. The current sensing device 140 serves to detect an overload in the power supply to the motor and acts as a circuit breaker to stop the motor when the overload is detected. Thus, when the tailgate is fully open or fully closed, an overload condition will develop and the overload will activate the sensing device 140 to stop the motor 100.

In use, the operator merely inserts the plug 132 in the socket 124 in the manner indicated for the purposes of rotating the platform to its horizontal position. Power is then supplied to the motor 100 to cause rotation of the power output shaft 120 in a first direction. Rotation of the shaft 120 causes rotation of the pinions 118, 116 and 114. Because the pinion 110 is held fast with respect to the shaft 24A, the rotation of the pinion 114 will result in movement of the gearbox 103 about the axis 102.

In order to cause the platform 32 to pivot to its upright position, it is merely necessary to relocate the plug 132 in the socket 124 so as to cause the motor 100 to operate to rotate the power output shaft 120 in the opposite direction.

It will be understood that the proportion of the pinions 110, 114, 116, 118 are selected to provide a gear reduction sufficient to ensure that the movement of the tailgate between its upright position and its horizontal position will be timed to provide for a gradual opening and closing at a speed which will not represent a hazard to the operator while being sufficiently rapid to avoid unnecessary delay in the operation of the tailgate.

These and other modifications of the present invention will be apparent to those skilled in the art.

I claim:

1. In a tailgate assembly of a truck or the like in which the tailgate is mounted for pivotal movement with respect to a support frame about a first axis, between an open position in which the tailgate is horizontally disposed and a closed position in which the tailgate is an upright position, the improvement of a powered closure mechanism for moving the tailgate from the opened position to the closed position comprising;
    (a) first and second complimentary cam members adapted to interact with one another such that longitudinal movement of said first cam member causes rotational movement of said first cam member with respect to said second cam member, said cam members being mounted for rotation of said first cam member about said first axis, said first cam member being fast with respect to said tailgate and said second cam member being fast with respect to said frame,
    (b) drive means mounted on said tailgate for driving said first cam member longitudinally with respect to said second cam member to cause rotation of said first cam member and thereby cause rotation of said tailgate with respect to said frame between said opened position and said closed position.

2. In a tailgate assembly as claimed in claim 1, wherein said second cam member is in the form of a tubular member, having a cam track formed in the wall of said tubular member and extending longitudinally thereof in a helical path, said drive means comprising a ram member mounted for longitudinal movement with respect to said platform in the direction of said first axis, said first cam member being mounted on said ram member and extending into said helical cam track of said second cam member.

3. In a tailgate assembly as claimed in claim 2, wherein the pitch of the helical path of the cam track varies along the length thereof such that the pitch is at a maximum over the portion of the length of the cam track along which the cam follower travels during the initial movement of the platform from the horizontal position toward the vertical postion.

4. In a tailgate assembly as claimed in claim 1, the further improvement of a storage compartment formed in the underside of the tailgate, said drive means and first and second complimentary cam members being housing in said compartment.

5. A tailgate assembly as claimed in claim 1, further comprising torsion bar means for resisting the rotation of the tailgate with respect to the frame during rotation from the horizontal position toward the vertical position.

6. In a tailgate assembly of a truck or the like in which the tailgate is mounted for pivotal mvoement with respect to a support frame about a first axis between an open position in which the tailgate is horizontally disposed and a closed position in which the tailgate is an upright position, the improvement of a powered closure mechanism for moving the tailgate from the opened position to the closed position comprising;
    (a) a shaft mounted on and fast with respect to said frame, said shaft having its axis aligned with said first axis, said tailgate being mounted for rotation on said shaft,
    (b) a stationary pinion mounted on and fast with respect to said shaft,
    (c) reversible motor mounted on said tailgate for movement therewith, said motor having a power output shaft, a power output pinion mounted on said power output shaft for rotation therewith,
    (d) reduction gear means drivingly connecting said power output pinion and said stationary pinion such that operation of said motor to cause rotation of said power output shaft in one direction will cause rotation of said tailgate in a first direction about said first axis and operation of said motor to cause rotation of said power output shaft in the other direction will cause rotation of said tailgate in a second direction opposite to said first direction to open or close said tailgate as required in use.

7. In a tailgate assembly as claimed in claim 1, the further improvement of a storage compartment formed in the underside of the tailgate housing said motor and reduction gear means being mounted in said storage compartment.

* * * * *